Figure 1:
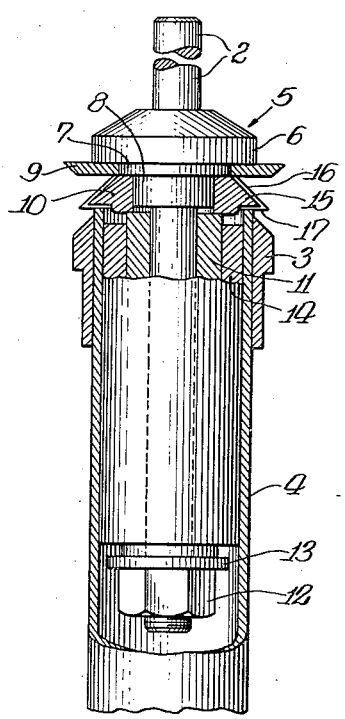

March 7, 1944.  W. J. WACHOWITZ  2,343,824

REAMER

Original Filed Aug. 10, 1939

INVENTOR.
Walter J. Wachowitz
By Brown, Jackson, Boettcher & Dienner
Atty's.

Patented Mar. 7, 1944

2,343,824

UNITED STATES PATENT OFFICE 2,343,824

REAMER

Walter J. Wachowitz, Waukesha, Wis.

Original application August 10, 1939, Serial No. 289,403. Divided and this application June 5, 1942, Serial No. 445,874

2 Claims. (Cl. 77—73.5)

My invention relates to an improvement in a reamer.

The present application is a division of my copending application Serial No. 289,403, filed August 10, 1939, for an improvement in Clamping device, now issued as Patent No. 2,291,666, dated August 4, 1942.

The reamer of the present application is particularly adapted for use in accurately reaming the ends of tubes secured in different types of ferrules or similar members. It is an object of my invention to provide a reamer having a reversible cutting member comprising teeth having two cutting edges arranged at different angles with respect to each other so that the reamer is adapted for reaming the ends of tubes having different types of ferrules or the like secured thereto. More specifically, I provide a reamer having a novel form of spindle and pilot means associated therewith for removably mounting the cutting member. Still more specifically, the spindle of the reamer is arranged to receive a guard member effective for guarding the teeth of the cutting member in either of its positions.

Further objects and advantages of my invention will appear from the detail description.

Figure 2:
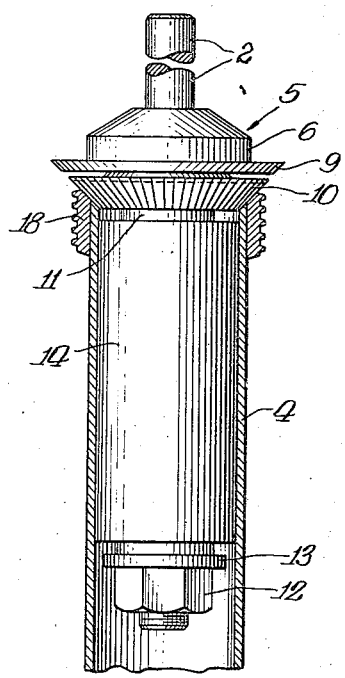

In the drawing:

Figure 1 is a lengthwise sectional view through a tube and ferrule applied thereto, illustrating one use of the reamer, the latter being shown mainly in elevation but with parts thereof broken away and in section; and Figure 2 is a lengthwise sectional view through a tube and ferrule applied thereto, of different type than the ferrule of Figure 1, showing another use of the reamer, the latter being shown in elevation.

In my above referred to application, I have disclosed a clamping device adapted for securing a ferrule 3 upon a tube 4 as by expanding the outer end of the tube 4 into the ferrule 3. The clamping device of that invention is provided with a saw guide for cutting away the tubing extending beyond the ferrule. In the type of ferrule indicated at 3, it is desirable to finish the end of the tube so that the inner corner thereof will lie in the plane of the beveled surface at the outer end of the ferrule, and the reamer of the present invention is employed for removing the saw marks and for trimming the tubing to the appropriate length. The beveled surface of the ferrule and the end of the tubing may then be faced in any suitable manner preferably by means of the abrading tool disclosed in my copending application Serial No. 445,875, filed June 5, 1942, which is also a division of the first above referred to application.

The reamer shown in Figures 1 and 2 is particularly suitable for reaming the end of the tubing in the manner stated. This reamer comprises a spindle having a shank 2 provided, intermediate its length, with a stepped structure 5 defining cylindrical elements 6, 7 and 8 of successively decreasing diameter and all of greater diameter than shank 2. An annular guard member 9 fits about element 7 and is confined between element 6 and a cutting member or disc 10 which fits about element 8. Cutting member 10 is confined between element 7 and an inner sleeve 11 which fits about shank 2 and is urged lengthwise thereof toward element 7 by a nut 12 screwing upon shank 2, there being a collar 13 disposed between nut 12 and the other end of sleeve 11 in contact therewith. By turning nut 12 tightly onto shank 2, the cutting member 10 is effectively clamped between the inner end of sleeve 11 and element 7. If desired, element 8 may be of squared or other suitable non-circular cross section, cutting member 10 having a corresponding opening therein for receiving element 8, though ordinarily clamping cutting member 10 between sleeve 11 and element 7 suffices for practical purposes. Sleeve 11 preferably is formed of steel and an outer sleeve 14, preferably formed of brass, is mounted upon sleeve 11 free therefrom, collar 13 being of somewhat greater diameter than sleeve 11 and serving to limit endwise movement of sleeve 14 away from the cutting member 10. The sleeves 11 and 14, the latter of which is of proper diameter to fit snugly, but not tightly, within tubing 4, provide a pilot structure which assures proper relation of the cutting member 10 to the end of tubing 4 during the reaming operation.

The cutting member comprises a plurality of radially disposed teeth 15, each having a cutting edge 16 inclined to shank 2 and a cutting edge 17 perpendicular to shank 2. In Figure 1, cutting member 10 is disposed so that the edges 17 of the teeth 15 are in contact with the end of tubing 4 for reaming the latter off normal to the axis of the tubing, the teeth 15 being, of course, of sufficient radial extent to project outward beyond the outer circumference of the tubing. The portion of shank 2 extending above the stepped structure 5 may be of cylindrical shape, as shown, suitable to be gripped in a chuck of a brace of known type, for rotating the reamer. After the end of tubing 4 has been reamed off in the manner stated, this end of the tubing and the conical outer end of ferrule 45 are accurately faced as described in my copending application Serial No. 445,875, filed June 5, 1942, above referred to, so as to provide a smooth and unbroken conical surface.

When it is desired to apply a threaded female ferrule to the end of tubing 4, such as ferrule 18 shown in Figure 2, the end of tubing 4 is cut off square, as before, and as described in my above first referred to application. In order to ream off the squared end of tubing 4 to correspond in taper with and form a continuation of the inner conical surface of ferrule 18 as shown in Figure 2, the cutting member 10 is removed from the reamer, which may readily be accomplished by removing the sleeves 11 and 14, and is replaced thereon reversely, as shown in Figure 2, so that the inclined cutting edges 16 of cutting member 10 are disposed to extend into the outer end of ferrule 18 into contact with the square cut end of tubing 4, it being understood that the bevel on edges 16 of teeth 15 correspond to the bevel of the inner conical surface of the ferrule. The cutting member 10 is then clamped in position, as before, the pilot structure of the reamer is inserted into the end of tubing 4 and the reamer is then rotated reaming off the end of the tubing so that it forms a continuation of the inner conical surface at the outer end of ferrule 18, as shown in Figure 2. The reamed end of the tubing and the conical surface of ferrule 65 may then be faced as by means of the abrading tool disclosed in my copending application Serial No. 445,875, filed June 5, 1942, to provide together a continuous and smooth conical surface.

It will be noted that in the position of cutting member 10 shown in Figure 2, as well as in the position of the cutting member shown in Figure 1, the guard member 9 extends outward beyond the cutting member and is effective as a guard therefor, guarding the teeth of the cutting member against injury and also guarding the operator against possible injury due to accidental contact with the teeth of the cutting member.

While I have shown the reamer of my invention, by way of example, as used for reaming straight tubing and ferrules or the like it may be used and adapted for other purposes.

I claim:

1. In a reamer, a spindle having a cylindrical element extending outward therebeyond and a stop element at one end of and extending outward beyond said cylindrical element, an inner sleeve fitting about said spindle, an outer sleeve fitting about said inner sleeve providing a bearing for rotatably supporting the latter, means for forcing said inner sleeve toward said cylindrical element and for retaining said outer sleeve on said inner sleeve, said means being removable for removal of said inner and outer sleeves from said spindle, and a reversible cutting member fitting above said cylindrical element clamped between said stop element and said inner sleeve, said cutting member comprising radially disposed teeth extending outward beyond said outer sleeve and having two cutting edges, arranged at different angles to the axis of said spindle.

2. In a reamer, a spindle comprising a shank and a stepped structure defining three elements decreasing in cross-section successively toward one end of the shank and extending outward therebeyond, an inner sleeve fitting about said shank from said one end thereof, an outer sleeve fitting about and providing a bearing rotatably supporting said inner sleeve, nut means threading on said one end of said shank for urging said inner sleeve toward said stepped structure, retaining means associated with said nut means and said inner sleeve effective for preventing endwise movement of said outer sleeve away from said stepped structure off of said inner sleeve, a cutting disc fitting about the element of said stepped structure of least cross-section and confined between the element of next greater cross-section and said inner sleeve, and an annular guard member fitting about the latter element and confined between said disc and the element of said stepped structure of greatest cross-section, said guard member extending radially outward beyond said disc, the latter comprising radially disposed teeth extending outward beyond said outer sleeve and having two cutting edges, one substantially perpendicular to said shank and the other inclined thereto.

WALTER J. WACHOWITZ.